United States Patent
Axelsson et al.

(10) Patent No.: US 10,088,572 B2
(45) Date of Patent: Oct. 2, 2018

(54) TIME-OF-FLIGHT CAMERA SYSTEM, ROBOT MILKING SYSTEM COMPRISING A TIME-OF-FLIGHT CAMERA SYSTEM AND METHOD OF OPERATING A TIME-OF-FLIGHT CAMERA SYSTEM

(71) Applicant: DELAVAL HOLDING AB, Tumba (SE)

(72) Inventors: Thomas Axelsson, Tumba (SE); Nils-Erik Holmertz, Tumba (SE); Helmut Obermuller, Tumba (SE)

(73) Assignee: DELAVAL HOLDING AB, Tumba (SE)

( * ) Notice: Subject to any disclaimer, the term of this patent is extended or adjusted under 35 U.S.C. 154(b) by 296 days.

(21) Appl. No.: 15/101,934

(22) PCT Filed: Dec. 4, 2014

(86) PCT No.: PCT/SE2014/051452
§ 371 (c)(1),
(2) Date: Jun. 6, 2016

(87) PCT Pub. No.: WO2015/084247
PCT Pub. Date: Jun. 11, 2015

(65) Prior Publication Data
US 2016/0306046 A1    Oct. 20, 2016

(30) Foreign Application Priority Data
Dec. 5, 2013    (SE) .......... 1351453

(51) Int. Cl.
*G01S 17/89* (2006.01)
*A01J 5/017* (2006.01)
(Continued)

(52) U.S. Cl.
CPC .......... *G01S 17/89* (2013.01); *A01J 5/0175* (2013.01); *G01S 7/4813* (2013.01); *G01S 17/88* (2013.01);
(Continued)

(58) Field of Classification Search
CPC .......... A01J 5/0175; A01J 5/017; A01J 5/007; A01J 5/0075; A01J 5/01; A01J 5/08
(Continued)

(56) References Cited

U.S. PATENT DOCUMENTS 4,346,973 A   8/1982   Katsuma et al.
7,490,576 B2  2/2009   Metcalfe et al.
(Continued)

FOREIGN PATENT DOCUMENTS

DE   20 2008 004 613 U1   6/2008
GB   2 469 161 A          10/2010
(Continued)

OTHER PUBLICATIONS

International—Type Search Report, dated Jun. 17, 2014, from corresponding PCT application.
(Continued)

*Primary Examiner* — Yvonne Renee Abbott-Lewis
(74) *Attorney, Agent, or Firm* — Young & Thompson

(57) ABSTRACT

A time-of-flight (TOF) camera system for a robot milking system includes a housing accommodating a light source, imaging optics, an image sensor, and electronics; a front part including a light transparent window disposed in front of the light source and the imaging optics; and fasteners. The housing has a front side and a back side, and the front part has a front side and a backside, the surface of the front side being flat and including a front surface of the light transparent window. The fasteners releasably mechanically fasten the front part to the housing with the back side of the front
(Continued)

part and the front side of the housing facing each other. The fasteners are maneuverable from the back side of the housing to fasten the front part to, and release the front part from, the housing, thereby enabling the front part to be replaceable.

34 Claims, 4 Drawing Sheets

(51) Int. Cl.
  *G01S 17/88* (2006.01)
  *G01S 7/481* (2006.01)
  *G01S 7/497* (2006.01)
(52) U.S. Cl.
  CPC ............. *G01S 2007/4975* (2013.01); *G05B 2219/45113* (2013.01)
(58) Field of Classification Search
  USPC .......... 119/14.08, 14.1, 14.14, 14.02, 14.01, 119/14.03, 14.18, 14.47
  See application file for complete search history.

(56) References Cited

U.S. PATENT DOCUMENTS

| | | | |
|---|---|---|---|
| 8,373,109 B2 * | 2/2013 | Boersma | A01J 5/0175 119/14.08 |
| 8,438,991 B2 * | 5/2013 | Van Den Berg | A01J 5/08 119/14.02 |
| 8,488,844 B2 * | 7/2013 | Springer | A01K 11/006 119/14.02 |
| 8,505,484 B2 * | 8/2013 | Andersson | A01J 5/0175 119/14.04 |
| 8,624,744 B2 * | 1/2014 | Holmgren | A01J 5/0175 119/14.02 |
| 8,770,145 B2 * | 7/2014 | Van Den Berg | A01J 5/007 119/14.05 |
| 8,794,181 B2 * | 8/2014 | Bareket | A01J 5/0175 119/14.02 |
| 8,800,487 B2 * | 8/2014 | Hofman | A01J 7/04 119/14.03 |
| 8,807,080 B2 | 8/2014 | Van Den Berg | |
| 2012/0272914 A1 | 11/2012 | Hofman et al. | |

FOREIGN PATENT DOCUMENTS

| | | |
|---|---|---|
| JP | 2013-021054 A | 1/2013 |
| RU | 2 415 567 C2 | 4/2011 |
| RU | 2 473 211 C2 | 1/2013 |
| SE | 9401633 L | 11/1995 |
| WO | 02/00011 A1 | 1/2002 |
| WO | 2009/093965 A1 | 7/2009 |
| WO | 2010/072580 A2 | 7/2010 |
| WO | 2010/094135 A1 | 8/2010 |
| WO | 2011/157647 A1 | 12/2011 |
| WO | 2012/087233 A1 | 6/2012 |
| WO | 2012/123948 A1 | 9/2012 |
| WO | 2012/149099 A1 | 11/2012 |
| WO | 2013/081544 A1 | 6/2013 |

OTHER PUBLICATIONS

European Search Report, dated Mar. 18, 2015, from corresponding European application.
International Search Report, dated Mar. 18, 2015, from corresponding PCT application.
Supplementary International Search Report, dated Dec. 4, 2015, from corresponding PCT application.

* cited by examiner

TIME-OF-FLIGHT CAMERA SYSTEM, ROBOT MILKING SYSTEM COMPRISING A TIME-OF-FLIGHT CAMERA SYSTEM AND METHOD OF OPERATING A TIME-OF-FLIGHT CAMERA SYSTEM

TECHNICAL FIELD OF THE INVENTION

The present invention relates generally to vision systems used in dairy farming. Particularly, the invention relates to a time-of-flight camera system for a robot milking system, to such a robot milking system, and to a method of operating such a time-of-flight camera system.

DESCRIPTION OF RELATED ART AND BACKGROUND OF THE INVENTION

The use of time-of-flight (TOF) cameras has received a lot of attention recently for use in robot milking systems. A time-of-flight camera is a range imaging camera system that resolves distance based on the known speed of light, measuring the time-of-flight of a light signal between the camera and the subject for each point of the image.

However, it is not straight-forward to implement the time-of-flight camera for a robot milking system due to the harsh environment, in which the time-of-flight camera should be used. Typically, the time-of-flight camera is located on a robot arm of a robot provided for attaching teat cups of the milking system to the teats of an animal to be milked. Therefore, the time-of-flight camera may come into close contact with not only parts of the barn in which the milking system is installed, but also into close contact with the animals.

As a result, the time-of-flight camera has to withstand not only dirt, animal faeces, various fluids, and possibly chemicals, such as cleaning chemicals, but also kicks and other mechanical stresses and strains. To this end the time-of-flight camera has to be robust and sealed. However, in particular, a front window or lens of the time-of-flight camera may become dirty and/or damaged, such as scratched, during use. Typically, cleaning systems are provided for cleaning the front window or lens of the time-of-flight camera repeatedly such as several times a day. Nevertheless, such cleaning may sometimes be insufficient, and in case the window or lens of the time-of-flight camera is seriously damaged, the time-of-flight camera may not be capable of being used any longer.

SUMMARY OF THE INVENTION

It is therefore an object to provide a time-of-flight camera system for a robot milking system, a robot milking system comprising a time-of-flight camera system, and a method of operating a time-of-flight camera system, which alleviate the problems discussed above.

It is a further object to provide such time-of-flight camera system and method, which can be adapted to various kinds of robot milking systems and such robot milking system comprising a time-of-flight camera system adaptable to the robot milking system.

It is a further object to provide such time-of-flight camera system, robot milking system, and method, which are efficient, reliable, of reasonable cost, and easy to use.

These objects, among others, are attained time-of-flight camera systems, robot milking systems, and methods of operating a time-of-flight camera system as defined in the appended patent claims.

In a first aspect, there is provided a time-of-flight camera system for a robot milking system comprising a housing accommodating a light source, imaging optics, an image sensor, and electronics; a front part including a light transparent window arranged in front of the light source and the imaging optics; and fasteners. The housing has a front side and a back side and the front part has a front side and a backside, wherein the surface of the front side is substantially flat and includes a front surface of the light transparent window. The fasteners are capable of releasably mechanically fastening the front part to the housing with the back side of the front part and the front side of the housing facing each other, wherein the fasteners are maneuverable from the back side of the housing to fasten the front part to, and release the front part from, the housing, thereby enabling the front part to be replaceable.

This aspect provides thus for a time-of-flight camera system, wherein a front part comprising a light transparent window is easily replaceable from the back side of the camera system enabling the front side of the camera system to be substantially flat without any fasteners or other details which could collect dirt, fluids, or chemicals and/or be seriously damaged during use.

This provides for fast, simple and efficient replacement of the light transparent window at the front side of the camera system, while still the camera system can be made robust, sealed, and dirt/fluid/chemical repellant. The replacement of the front part with the light transparent window can be made when the light transparent window has become damaged or at least very dirty, and/or can be made to adapt the time-of-flight camera system for a particular kind of robot milking system.

In a second aspect there is provided a robot milking system comprising a time-of-flight camera system of the first aspect. The robot milking system may comprise a robot arm for attaching teat cups of the robot milking system to the teats of a milking animal, wherein the time-of-flight camera system can be mounted on the robot arm.

In a third aspect, there is provided a method of operating a time-of-flight camera system with a robot milking system, the time-of-flight camera system comprising a housing including a light source, imaging optics, an image sensor, and electronics; a front part including a light transparent window arranged in front of the light source and the imaging optics; and fasteners, wherein the housing has a front side and a back side; the front part has a front side and a backside, the surface of the front side is substantially flat and includes a front surface of the light transparent window; the fasteners are capable of releasably mechanically fastening the front part to the housing with the back side of the front part and the front side of the housing facing each other, and the fasteners are maneuverable from the back side of the housing to fasten the front part to, and release the front part from, the housing. According to the method, the front part is mechanically fastened to the housing with the back side of the front part facing the front side of the housing by means of maneuvering the fasteners from the back side of the housing; and images are recorded by the time-of-flight camera system in connection with operation of the robot milking system.

At some point of time, a front part replacement procedure may be initiated, in which the front part is mechanically released from the housing by means of maneuvering the fasteners from the back side of the housing, such that the front part can be removed and be replaced.

A sealing may be arranged to seal the interface between the front part and the housing when the front part is fastened to the housing to avoid dirt, moisture, and liquids from entering into the housing of the camera system.

The fasteners may be realized as screws, bolts, or the like which are introduced through holes in the housing and tightened in threaded holes in the front part. It is advantageous that the fasteners can be maneuvered by means of standard tools.

In one embodiment, the housing may comprise a main housing, a back part, and fasteners capable of releasably mechanically fastening the back part to the main housing. These fasteners may be maneuverable from the front side of the housing to fasten the back part to, and release the back part from, the main housing, thereby enabling the back part to be replaceable. A sealing may be arranged to seal the interface between the back part and the main housing when the back part is fastened to the main housing to avoid dirt, moisture, and liquids from entering into the housing of the camera system. These fasteners may be realized as screws, bolts, or the like which are introduced through holes in the housing and tightened in threaded holes in the back part.

The front part may be provided in a plurality of models.

In one model of the front part, the front surface of the light transparent window is free from any coating, film, or layer.

In another model of the front part, the light transparent window may comprise a non-stick, liquid repellence, dirt repellence, and/or anti-scratch coating, film, or layer on the front side of the front part, i.e. such that the top surface of this coating, film, or layer constitutes the front surface of the light transparent window.

In yet another model of the front part, the light transparent window may comprise a coating, film, or layer, on the back side of the front part, i.e. such that the top surface of this coating, film, or layer constitutes a back surface of the light transparent window facing the housing when the front part is fastened to the housing. The coating, film, or layer may be an optical filter or an anti-reflective or anti-glare coating.

Still another model of the front part is suitable for a design, wherein the light source includes a plurality of light emitting units. In this model, the light transparent window may comprise a coating, film, or layer which includes a light opaque ring defining a first light transparent section of the light transparent window arranged in front of the imaging optics and a second light transparent section of the light transparent window arranged in front of the light emitting units. The light emitting units may be arranged around the imaging optics in the housing, wherein the first light transparent section is an inner light transparent section and the second light transparent section is an outer light transparent section.

In an alternative model for the above design, the light transparent window may comprise at least three parts mounted together, a first light transparent window section, a second light transparent window section, and a light opaque window section separating the first and second light transparent window sections, wherein the first light transparent window section is arranged in front of the imaging optics and the second light transparent window section is arranged in front of the light emitting units. The light emitting units may be arranged around the imaging optics in the housing, wherein the first light transparent window section is an inner light transparent window section and the second light transparent window section is an outer light transparent window section.

The light transparent window may comprise sapphire glass, gorilla glass, or a light transparent ceramics such as e.g. aluminum oxynitride.

The housing and the front part except the light transparent window may be made of aluminum and have major portions of their outer surfaces anodized.

The front part may comprise an identification tag comprising data, by which the model and/or serial number of the front part can be uniquely identified.

In one embodiment, a plurality of front parts of different models, and a data sheet, in which each of the models is recommended for use with one or more kinds of robot milking system, are provided. The kind of the robot milking system, with which the camera system is operated, is identified, and the model of the front part, which is mechanically fastened to the housing, is selected to be a recommended model for use with the identified kind of the robot milking system.

In one other embodiment, the robot milking system or the camera system may comprise image processing means arranged to analyze images taken by the camera system to thereby detect if the light transparent window of the front part has become damaged and alerting means arranged to alert an operator or a control system of the robot milking system of the fact that the light transparent window of the front part is damaged and should be replaced.

The image processing means may be realized by any kind of processing electronics or software run on a microcomputer. The alerting means may be any kind of device for alerting an operator visually, e.g. on a display, or via an audio alarm. If the alerting means is arranged to alert a control system of the robot milking system, this is achieved by means of signaling to the control system of the robot milking system.

In another embodiment, the robot milking system or the camera system may comprise image processing means arranged to analyze images taken by the camera system to thereby detect if the light transparent window of the front part has become dirty and alerting means arranged to alert an operator or a control system of the robot milking system of the fact that the light transparent window of the front part is dirty and should be cleaned and/or replaced.

In a front part replacement procedure, the front part fastened to the housing is mechanically released from the housing by means of maneuvering the fasteners from the back side of the housing; the front part is removed from the housing; an other front part of any of the above disclosed models is arranged in front of the housing with the back side of the front part facing the front side of the housing such that the light transparent window of the other front part is placed in front of the light source and the imaging optics; and the other front part is mechanically fastened to the housing with the back side of the front part facing the front side of the housing by means of maneuvering the fasteners from the back side of the housing.

The replacement procedure may be initiated in response to (i) detecting a damage of the front part, e.g. by means of analyzing images taken by the camera system, (ii) detecting a single or repeated failed cleaning of the front part, or (iii) detecting that the model of the front part is not a recommended model for use with the kind of the robot milking system.

Further characteristics of the invention, and advantages thereof, will be evident from the detailed description of preferred embodiments of the present invention given hereinafter, and the accompanying FIGS. 1-5, which are given by way of illustration only and thus are not limitative of the present invention.

DETAILED DESCRIPTION OF EMBODIMENTS

Figure 1A:
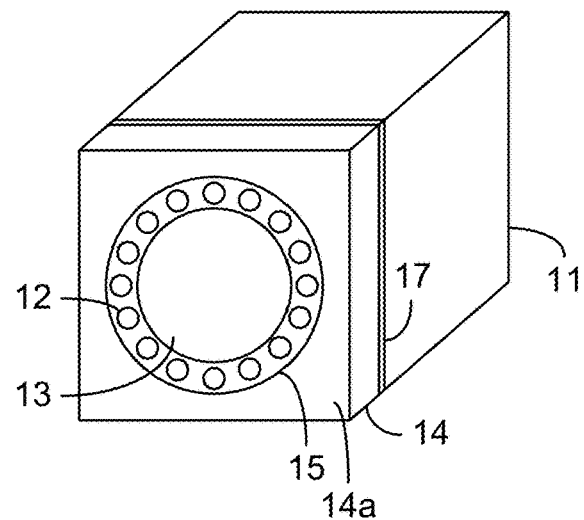
FIGS. 1a-c illustrate, schematically, in perspective view from the front, cross-sectional side view, and perspective view from behind, a time-of-flight camera system for a robot milking system according to an embodiment of the invention.
Figure 1B:
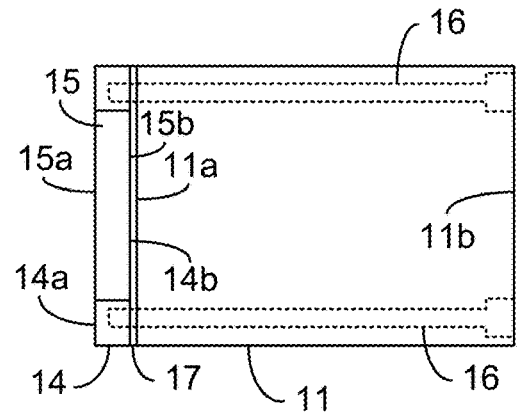
Figure 1C:
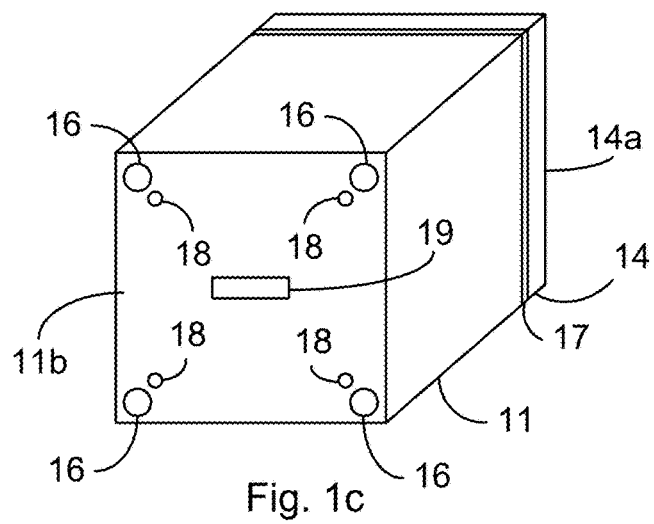

FIGS. 1a-c illustrate, schematically, in perspective view from the front, cross-sectional side view, and perspective view from behind, a time-of-flight camera system for a robot milking system according to an embodiment of the invention.

The time-of-flight camera system comprises a housing 11 accommodating a light source 12, imaging optics 13, an image sensor, and electronics (not explicitly illustrated), a front part 14 including a light transparent window 15 arranged in front of the light source 12 and the imaging optics 13, and fasteners 16. The light source 12 may include a plurality of light emitting units 12 arranged around the imaging optics 13 in the housing 11. The imaging optics 13 may have a circularly shaped front window or lens visible through the light transparent window 15 of the front part, which in turn may be circularly shaped.

There may be arranged a sealing (not illustrated) to seal the interface between the light transparent window 15 and the rest of the front part 14 when the front part 14 is assembled.

The housing 11 has a front side 14a and a back side 14b, the front part has a front side 14a and a backside 14b, wherein the surface of the front side 14a may be entirely flat and includes a front surface 15a of the light transparent window 15.

The fasteners 16 are capable of releasably mechanically fastening the front part 14 to the housing 11 with the back side 14b of the front part 14 and the front side 14a of the housing 11 facing each other, wherein the fasteners are maneuverable from the back side 14b of the housing 11 to fasten the front part 14 to, and release the front part 14 from, the housing 11, thereby enabling the front part 14 to be replaceable.

The fasteners 16 may be realized as screws, bolts, or the like which are introduced through holes in the housing 11 and are tightened in threaded holes in the front part 14. It is advantageous that the fasteners 16 can be maneuvered from the back side 11b of the housing 11 by means of standard tools.

Further, there is arranged a sealing 17 to seal the interface between the front part 14 and the housing 11 when the front part 14 is fastened to the housing 11. When the front part 14 is removed from the housing 11, still the housing may be sealed via a second protection barrier.

Further, there are threaded holes 18 and a connector 19 on the back side 14b of the housing 11 for e.g. mechanical 18 and electrical 19 connections to the camera system. Such connector may interconnect the housing 11 and the electronics therein and a further control and/or processing system such as e.g. an image processing device (if not all image processing is performed by the electronics within the housing 11) or a control system of the robot milking system. The holes are preferably threaded holes 18 by which bolts, screws, or the like can tighten the connector to the housing 11. The camera system may be mechanically mounted either via the connector or via threaded holes on a bottom side of the housing (not illustrated)

Figure 2:
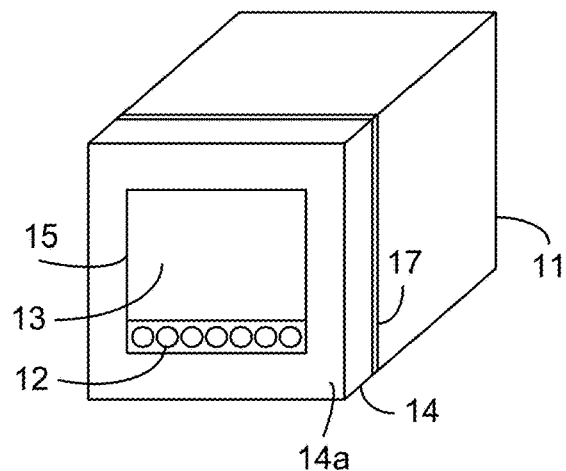
FIG. 2 illustrates, schematically, in perspective view from the front, a time-of-flight camera system for a robot milking system according to an embodiment of the invention.

FIG. 2 illustrates, schematically, in perspective view from the front, a time-of-flight camera system for a robot milking system according to an embodiment of the invention. The camera system of FIG. 2 differs from the camera system of FIG. 1 only with respect to the light source 12, optionally the imaging optics 13, and the light transparent window 15 of the front part 14. Here, the light source 12 includes a plurality of light emitting units 12 arranged in a straight line below the imaging optics 13 in the housing. The imaging optics 13 may have a front window or lens of rectangular shape visible through the light transparent window 15 of the front part, which may also have rectangular shape.

It shall be appreciated that the light emitting units 12 may alternatively be arranged in yet other fashions such as at a side of the imaging optics 13 or above the imaging optics 13.

Figure 3A:
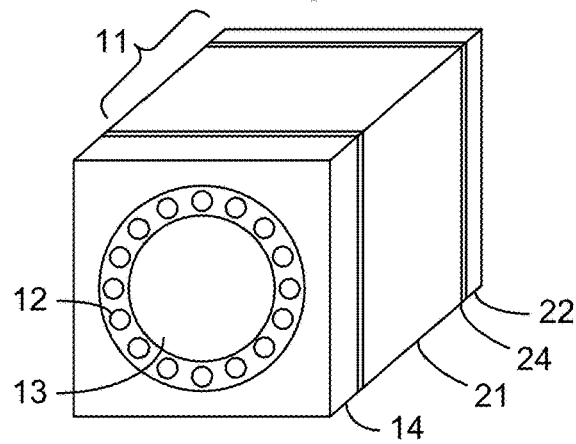
FIGS. 3a-b illustrate, schematically, in perspective view from the front and perspective view from the front with a front part removed, a time-of-flight camera system for a robot milking system according to an embodiment of the invention.
Figure 3B:
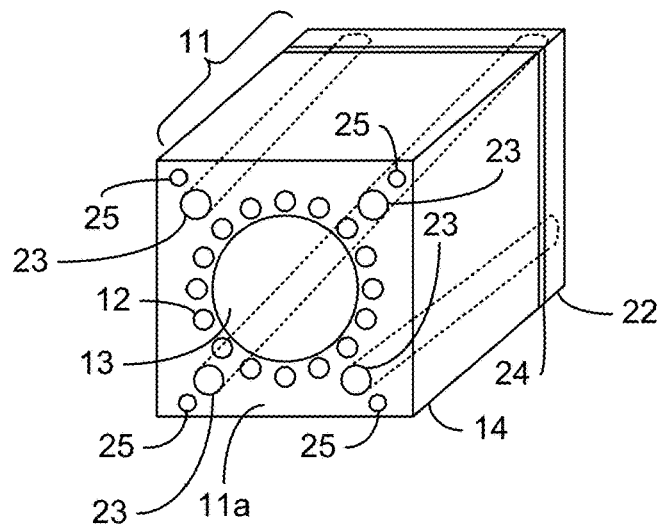

FIGS. 3a-b illustrate, schematically, in perspective view from the front and perspective view from the front with a front part removed, a time-of-flight camera system for a robot milking system according to an embodiment of the invention.

This embodiment differs from the embodiment of FIGS. 1a-c in that the housing 11 is divided into a main housing 21 and a back part 22 releasably attachable to one another. Further fasteners 23 are provided for releasably mechanically fastening the back part 22 to the main housing 21. In particular, the further fasteners 23 may be maneuverable from the front side 11a of the housing 11 to fasten the back part 22 to, and release the back part 22 from, the main housing 21, thereby enabling also the back part 22 to be replaceable. The further fasteners 23 may be realized as screws, bolts, or the like which are introduced through holes in the housing 11 and are tightened in threaded holes in the back part 22.

A sealing 24 may be arranged to seal the interface between the back part 22 and the main housing 21 when the back part 22 is fastened to the main housing 21.

The housing 11 and the front part 15 except the light transparent window 15 may be made of aluminum and have major portions of their exterior surfaces anodized. In principle, all exterior surfaces which are exposed to the environment during use may be anodized. The surfaces of the front part 14 and the housing 11 may advantageously have flat surface, i.e. no heat-sink patterns ought to be present.

The front part 14 and the hosing 11 or the main housing 21 and the pack part 22 may be in electric contact with one another when being mounted in order to efficiently shield the electronics therein.

The light transparent window 15 of the front part 14 may comprise sapphire glass, gorilla glass, or a light transparent ceramics such as e.g. aluminum oxynitride. This list is not exhaustive; other materials may be used for the light transparent window 15 of the front part 14.

The front part 14 may comprise an identification tag comprising data, by which the model and/or serial number of the front part can be uniquely identified.

FIGS. 4a-d illustrate each, schematically, in cross-sectional side view, a model of a front part of a time-of-flight camera system for a robot milking system according to a respective embodiment of the invention.

Figure 4A:
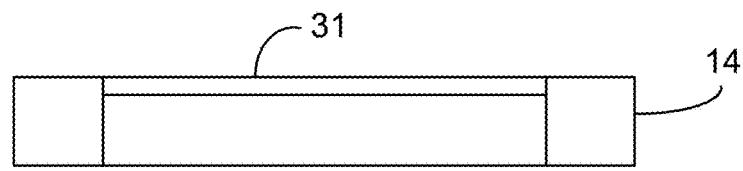
FIGS. 4a-d illustrate each, schematically, in cross-sectional side view, a front part of a time-of-flight camera system for a robot milking system according to an embodiment of the invention.

In one embodiment, illustrated in FIG. 4a, the light transparent window of the front part 14 comprises a non-stick, liquid repellence, dirt repellence, and/or anti-scratch coating, film, or layer 31, wherein the top surface of the coating, film, or layer 31 constitutes the front surface of the light transparent window.

In another embodiment, the front surface of the light transparent window is free from any coating, film, or layer.

Figure 4B:
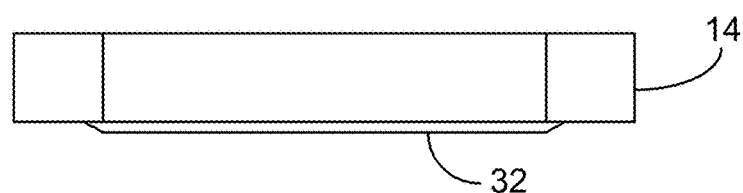

In yet another embodiment, illustrated in FIG. 4b, the light transparent window of the front part 14 comprises a coating, film, or layer 32, wherein the top surface of the coating, film, or layer 32 constitutes a back surface of the light transparent window facing the housing when the front part is fastened to the housing. The coating, film, or layer may be an optical filter or an anti-reflective or anti-glare coating.

Figure 4C:
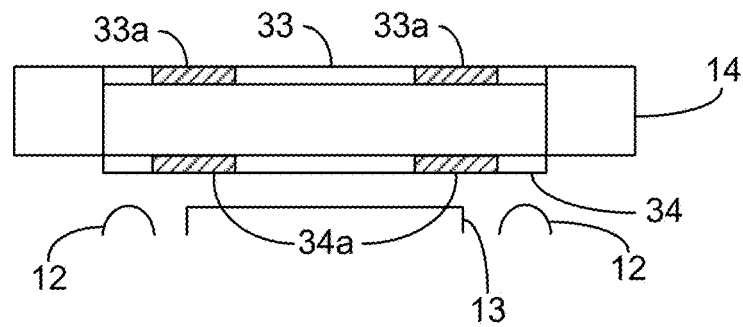

Still another embodiment, illustrated in FIG. 4c, is applicable to a camera system wherein the light source includes a plurality of light emitting units 12 arranged around the imaging optics 13 in the housing, see FIGS. 1a-c. The light transparent window of the front part 14 may comprise a coating, film, or layer 33, 34 at each face thereof, which includes a light opaque ring 33a, 33b defining an inner light transparent section of the light transparent window arranged in front of the imaging optics 13 and an outer light transparent section of the light transparent window arranged in front of the light emitting units 12 arranged around the imaging optics.

The light transparent window may additionally, or alternatively, be a laminated layer wherein one or more coatings, films, or layers similar to the coatings, films, or layers 33, 34 may be arranged within the light transparent window between laminated layers.

It shall be appreciated that one of the coatings, films, or layers 33, 34 may be dispensed with and in case there are one or more coatings, films, or layers 33, 34 arranged within the light transparent window, both the coatings, films, or layers 33, 34 may be dispensed with.

Figure 4D:
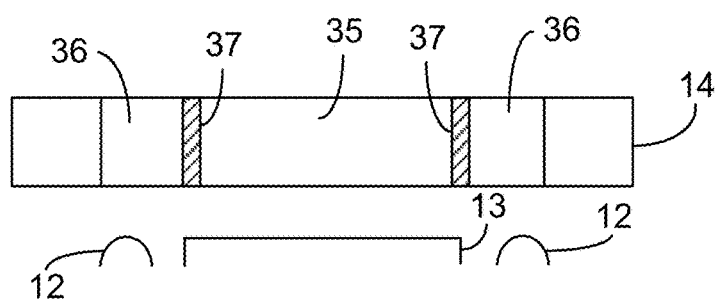

Yet another embodiment, illustrated in FIG. 4d, is applicable to a camera system wherein the light source includes a plurality of light emitting units 12 arranged around the imaging optics 13 in the housing, see FIGS. 1a-c. The light transparent window of the front part 14 may comprise three parts mounted together, an inner light transparent window section 35, an outer light transparent window section 36, and a light opaque window section 37 separating the inner and outer light transparent window sections. The inner light transparent window section 35 is arranged in front of the imaging optics 13 and the outer light transparent window section 36 is arranged in front of the light emitting units 12 arranged around the imaging optics.

The embodiments of FIGS. 4c and 4d may be modified to be used with camera systems with different positions and/or orientations of the of light emitting units 12 and the imaging optics 13 in the housing, such as e.g. those disclosed with reference to FIG. 2.

The invention relates further to a robot milking system comprising a time-of-flight camera system according to any of the embodiments disclosed above. The robot milking system may typically comprise a robot arm for attaching teat cups of the robot milking system to the teats of a milking animal. The time-of-flight camera system may typically be mounted on the robot arm and may be covered by a cover protecting the sides and the top of the housing and the front part. A horizontally arranged shield may be mounted on top of the time-of-flight camera system, which shield protrudes forwardly past the front part and protects the light transparent window of the front part from being dirty and/or damaged.

The robot milking system or the camera system may comprise image processing means arranged to analyze images taken by the camera system, to thereby detect if the light transparent window of the front part has become damaged, and alerting means arranged to alert an operator or a control system of the robot milking system of the fact that the light transparent window of the front part is damaged and should be replaced.

Additionally, or alternatively, the robot milking system or the camera system may comprise image processing means arranged to analyze images taken by the camera system, to thereby detect if the light transparent window of the front part has become dirty, and alerting means may be arranged to alert an operator or a control system of the robot milking system of the fact that the light transparent window of the front part is dirty and should be cleaned and/or replaced.

Figure 5:
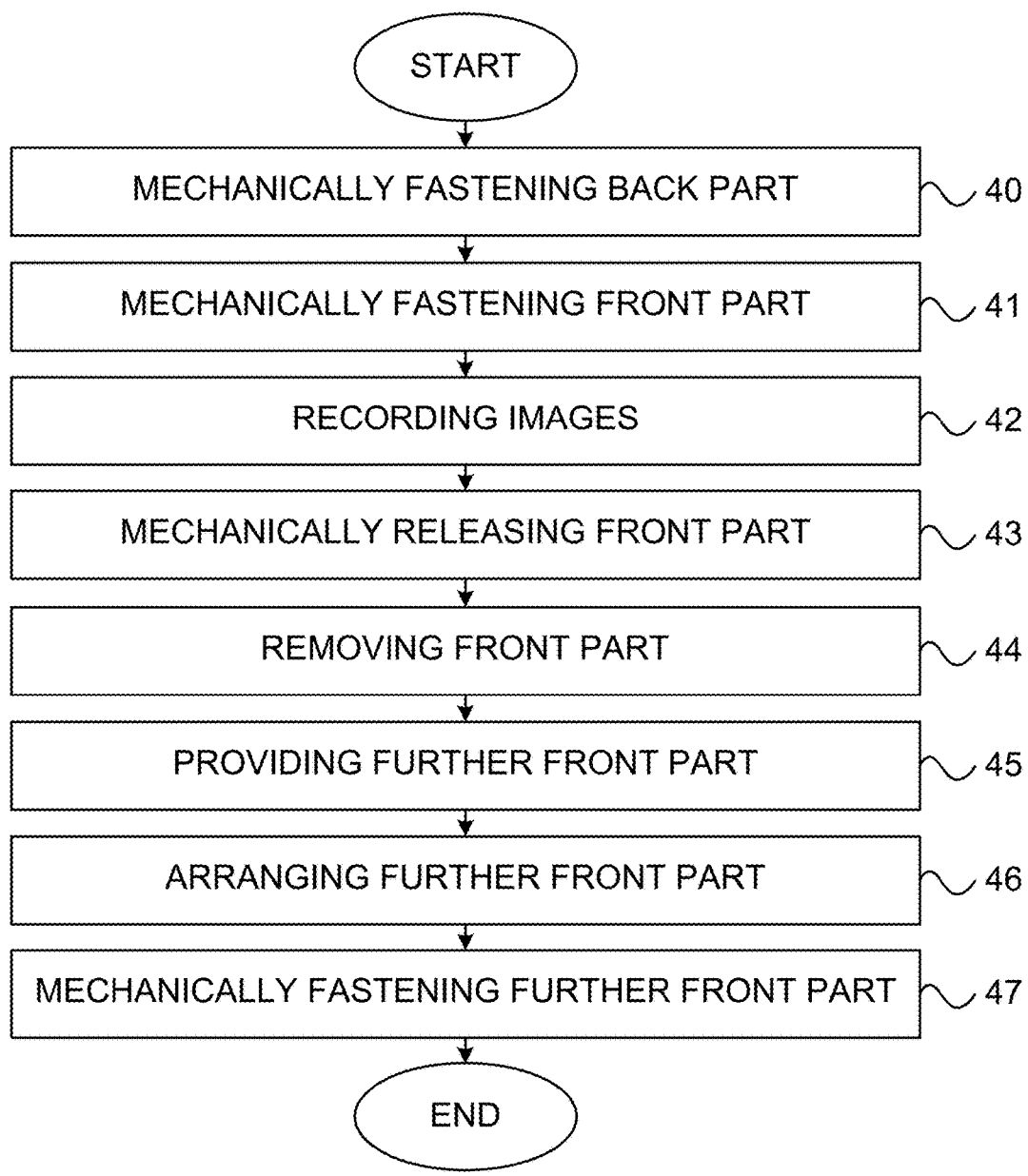
FIG. 5 is a flow scheme of a method of operating a time-of-flight camera system for a robot milking system according to an embodiment of the invention.

FIG. 5 is a flow scheme of a method of operating a time-of-flight camera system for a robot milking system according to an embodiment of the invention. The time-of-flight camera system may be any of the embodiments disclosed above, but includes at least a housing including a light source, imaging optics, an image sensor, and electronics; a front part including a light transparent window arranged in front of the light source and the imaging optics; and fasteners. The housing has a front side and a back side; the front part has a front side and a backside; the surface of the front side may be entirely flat and includes a front surface of the light transparent window; and the fasteners are capable of releasably mechanically fastening the front part to the housing with the back side of the front part and the front side of the housing facing each other, wherein the fasteners are maneuverable from the back side of the housing to fasten the front part to, and release the front part from, the housing. The housing may comprise a main housing and a back part, wherein further fasteners are provided, which are capable of releasably mechanically fastening the back part to the main housing.

According to the method, if the housing comprises a main housing and a back part, the back part is, in a step 40, mechanically fastened to the main housing by means of maneuvering the further fasteners, preferably from the front side of the housing. This step may be omitted if the housing is in one piece.

Next, the front part is, in a step 41, mechanically fastened to the housing with the back side of the front part facing the front side of the housing by means of maneuvering the fasteners from the back side of the housing. Sealings are provided to seal the camera system when the front part and optionally the back part are mounted.

The replaceable front part is now mounted and the time-of-flight camera system is ready for use. Images are thus, in a step 42, recorded by the time-of-flight camera system in connection with operation of the robot milking system.

In one embodiment, a data sheet, in which each of a plurality of models of the front part is recommended for use with one or more kinds of robot milking system, is provided. The kind of the robot milking system, with which the camera system is operated, is identified, and the model of the front part, which is mechanically fastened to the housing, is selected to be a recommended model for use with the identified kind of the robot milking system. For instance, if the robot milking system is installed in a sand bed environment, scratches may occur frequently due the occurrence of sand particles. In such kind of robot milking system a model of the front part wherein the light transparent window is of a very hard material such as sapphire may be recommended. In other robot milking systems system a cheaper model of the front part may be recommended, such as e.g. a model wherein the light transparent window is of gorilla glass.

In a further embodiment, at some point, when the front part should be replaced, the mounted front part is, in a step 43, mechanically released the from the housing by means of maneuvering the fasteners from the back side of the housing, and the front part is, in a step 44, removed from the housing. A replacement front part is, in a step 45, provided, wherein the replacement front part includes light transparent window and has a front side and a backside, wherein the surface of the front side may be entirely flat and includes a front surface of the light transparent window. The replacement front part is, in a step 46, arranged in front of and up against the housing with the back side of the front part facing the front side of the housing such that the light transparent window of the further front part is placed in front of the light source and the imaging optics. Finally, the replacement front part is, in a step 47, mechanically fastened to the housing by means of maneuvering the fasteners from the back side of the housing.

A replacement of the front part may be performed in response to detecting damage, or failed cleaning, of the front part. Such damage or failed cleaning of the front part may be detected by means of analyzing images taken by the time-of-flight camera system. The replacement front part may here be of the same model as the replaced front part.

A replacement may alternatively, or additionally, be performed in response to detecting that the model of the front part is incorrect or at least not recommended. The replacement front part may here be of a correct or recommended model, and thus of a different model as the replaced front part.

The invention claimed is:

1. A time-of-flight (TOF) camera system configured to be used in a robot milking system, the camera system comprising:
    a housing (11) accommodating a light source (12), imaging optics (13), an image sensor, and electronics, the housing including a front side (11a) and a back side (11b);
    a front part (14) including a light transparent window (15) arranged in front of the light source and the imaging optics, the front part having a front side (14a) and a back side (14b), the surface of the front side of the front part being substantially flat and including a front surface (15a) of the light transparent window; and
    a plurality of fasteners (16) releasably mechanically fastening the front part to the housing with the back side of the front part and the front side of the housing facing each other, the fasteners being maneuverable from the back side of the housing to fasten the front part to, and release the front part from, the housing, thereby enabling the front part to be replaceable.

2. The camera system of claim 1, further comprising a sealing (17) configured to seal an interface between the front part and the housing when the front part is fastened to the housing.

3. The camera system of claim 1, further comprising a protection barrier (17) disposed adjacent the housing to seal the housing when the front part is released from the housing.

4. The camera system of claim 1, wherein the housing comprises a main housing (21) and a back part (22), and
    the camera system further comprises additional fasteners (23) releasably mechanically fastening the back part to the main housing.

5. The camera system of claim 4, wherein the additional fasteners that releasably mechanically fasten the back part to the main housing are maneuverable from the front side of the housing to fasten the back part to, and release the back part from, the main housing, thereby enabling the back part to be replaceable.

6. The camera system of claim 4, further comprising a sealing (25) configured to seal an interface between the back part and the main housing when the back part is fastened to the main housing.

7. The camera system of claim 1, wherein the front surface of the light transparent window is free from any coating, film, or layer.

8. The camera system of claim 1, wherein the light transparent window comprises a non-stick, liquid repellent, dirt repellent, and/or anti-scratch coating, film, or layer (31), a top surface of the coating, film, or layer constituting the front surface of the light transparent window.

9. The camera system of claim 1, wherein the light transparent window comprises a coating, film, or layer (32), a top surface of the coating, film, or layer constituting a back surface of the light transparent window facing the housing when the front part is fastened to the housing.

10. The camera system of claim 9, wherein said coating, film, or layer is an optical filter or an anti-reflective or anti-glare coating.

11. The camera system of claim 1, wherein the light source includes a plurality of light emitting units (12), and
    the light transparent window comprises a coating, film, or layer (33; 34) which includes a light opaque portion (33a; 33b) defining a first light transparent section of the light transparent window disposed in front of the imaging optics, and a second light transparent section of the light transparent window disposed in front of the light emitting units.

12. The camera system of claim 11, wherein the light emitting units (12) are disposed around the imaging optics (13) in the housing,
    the first light transparent section is an inner light transparent section, and
    the second light transparent section is an outer light transparent section.

13. The camera system of claim 1, wherein the light source includes a plurality of light emitting units (12),
    the light transparent window comprises at least three parts mounted together including a first light transparent window section (35), a second light transparent window section (36), and a light opaque window section (37) separating the first and second light transparent window sections, and
    the first light transparent window section is disposed in front of the imaging optics, and the second light transparent window section is disposed in front of the light emitting units.

14. The camera system of claim 13, wherein the light emitting units (12) are disposed around the imaging optics (13) in the housing, the first light transparent window section is an inner light transparent window section, and the second light transparent window section is an outer light transparent window section.

15. The camera system of claim 1, wherein the light transparent window comprises one or more of sapphire glass, gorilla glass, and a light transparent ceramics.

16. The camera system of claim 1, wherein the light transparent ceramics comprises aluminum oxynitride.

17. The camera system of claim 1, wherein the housing and the front part except the light transparent window are made of aluminum and have major portions of outer surfaces thereof anodized.

18. The camera system of claim 1, wherein the front part comprises an identification tag comprising data, by which one or more of a model and a serial number of the front part are able to be uniquely identified.

19. The camera system of claim 1, further comprising a plurality of front parts of different models, and a data sheet, in which each of the models is recommended for use with one or more kinds of robot milking systems.

20. A robot milking system, comprising:
the camera system of claim 1.

21. The robot milking system of claim 20, further comprising a robot arm configured to perform an action on an animal,
wherein the camera system is mounted on the robot arm.

22. The robot milking system of claim 20, further comprising an image processor configured to analyze images obtained by the camera system to thereby detect when the light transparent window of the front part becomes damaged; and
an alerting system configured to alert an operator or a control system of the robot milking system when the light transparent window of the front part is detected to be damaged.

23. The robot milking system of claim 20, further comprising an image processor configured to analyze images obtained by the camera system to thereby detect when the light transparent window of the front part becomes dirty; and
an alerting system configured to alert an operator or a control system of the robot milking system when the light transparent window of the front part is detected to be dirty.

24. A method of operating a time-of-flight (TOF) camera system in a robot milking system, the camera system including a housing (11) including a light source (12), imaging optics (13), an image sensor, and electronics; a front part (14) including a light transparent window (15) disposed in front of the light source and the imaging optics; and a plurality of fasteners (16), the housing having a front side (11a) and a back side (11b), the front part having a front side (14a) and a backside (14b), the surface of the front side being substantially flat and including a front surface (15a) of the light transparent window, the fasteners releasably mechanically fastening the front part to the housing with the back side of the front part and the front side of the housing facing each other, the fasteners being maneuverable from the back side of the housing to fasten the front part to, and release the front part from, the housing, the method comprising:
mechanically fastening (41) the front part to the housing, with the back side of the front part facing the front side of the housing, by maneuvering the fasteners from the back side of the housing; and
recording (42) images by the time-of-flight camera system in connection with performing actions on animals in the robot milking system.

25. The method of claim 24, further comprising sealing an interface between the front part and the housing when the front part is fastened to the housing.

26. The method of claim 24, further comprising sealing the housing via a protection barrier disposed adjacent the housing when the front part is released from the housing.

27. The method of claim 24, wherein the housing comprises a main housing (21) and a back part (22), and the camera system further comprises additional fasteners (23) releasably mechanically fastening the back part to the main housing,
the method further comprising mechanically fastening (40) the back part to the main housing by maneuvering the additional fasteners prior to mechanically fastening the front part to the housing.

28. The method of claim 27, wherein the mechanically fastening the back part to the main housing is performed by maneuvering the additional fasteners from the front side of the housing.

29. The method of claim 24, further comprising:
providing a data sheet, in which each of a plurality of models of the front part is recommended for use with one or more kinds of robot milking systems;
identifying the kind of the robot milking system, with which the camera system is operated; and
selecting the model of the front part, which is mechanically fastened to the housing, to be a recommended model for use with the identified kind of the robot milking system.

30. The method of claim 24, further comprising:
subsequent to the step of recording images:
mechanically releasing (43) the front part from the housing by maneuvering the fasteners from the back side of the housing;
removing (44) the front part from the housing;
providing (45) an additional front part (14) including a light transparent window (15) and having a front side (14a) and a backside (14b), the surface of the front side being flat and including a front surface (15a) of the light transparent window;
arranging (46) the additional front part in front of the housing with the back side of the front part facing the front side of the housing such that the light transparent window of the additional front part is placed in front of the light source and the imaging optics; and
mechanically fastening (47) the additional front part to the housing with the back side of the front part facing the front side of the housing by maneuvering the fasteners from the back side of the housing.

31. The method of claim 30, wherein the removing the front part, the providing the additional front part, the arranging the additional front part, and the mechanically fastening the additional front part are performed in response to detecting damage of the front part, the front part and the additional front part being of a same model.

32. The method of claim 31, wherein the damage of the front part is detected by analyzing images obtained by the camera system.

33. The method of claim 30, wherein the removing the front part, the providing the additional front part, the arranging the additional front part, and the mechanically fastening the additional front part are performed in response to detecting a failed cleaning of the front part, the front part and the additional front part being of a same model.

34. The method of claim 30, wherein the removing the front part, the providing the additional front part, the arranging the additional front part, and the mechanically fastening the additional front part are performed in response to detecting the model of the front part, the front part and the additional front part being different models.

* * * * *